_United States Patent Office_

3,198,840
Patented Aug. 3, 1965

3,198,840
DERIVATIVES OF DIPHENYL SYNTHETIC
ESTROGENS
Emil Kaiser, Chicago, and Byron M. Shinn, Western
Springs, Ill., assignors, by mesne assignments, to
Armour Pharmaceutical Company, a corporation of
Delaware
No Drawing. Filed May 11, 1960, Ser. No. 28,238
7 Claims. (Cl. 260—613)

This invention relates to methylallyl derivatives of diphenyl synthetic estrogens. More particularly, this invention relates to disubstituted methylallyl derivatives of hexane, hexene and hexadiene, and to methods for their preparation. The methylallyl derivatives of our invention are disubstituted by a radical having the following structure:

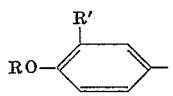

wherein R and R' represent hydrogen and a methylallyl radical, provided that when R is hydrogen R' is a methylallyl radical, and that when R' is hydrogen R is a methylallyl radical.

Kaiser et al., in U.S. Patents 2,502,324 and 2,502,325, introduced allyl substituents into the molecules of synthetic or artificial estrogens, resulting in decreased estrogenic activity. By introducing methylallyl substituents into synthetic estrogens further desirable modifications in the physiological activity of these compounds has been achieved. The compounds of this invention are useful as intermediates in the production of certain diphenyl synthetic estrogen derivatives, and as essentially non-estrogenic growth promotants in the feeding of livestock and poultry.

We have found that the products of our invention may be prepared by using diphenyl estrogens such as diethylstilbestrol, hexestrol, dienestrol and benzestrol. Preferably the meso forms of these compounds are employed but our derivatives may be prepared from various mixtures of the meso and racemic forms of the synthetic estrogens.

The methylallyl derivatives of this invention may be obtained by reacting a suitable diphenyl estrogen and a halomethylpropane. Preferably the reaction is conducted in the presence of an alkaline compound capable of reacting with the halogen element of the propene. Examples of such alkaline compounds are barium hydroxide, calcium carbonate, potassium carbonate, or sodium hydroxide. The reaction is preferably carried out in an organic solvent which is nonreactive with respect to the derivatives. Examples of such organic solvents are methylethylketone, acetone, benzene and the like.

As indicated, halomethylpropene, such as the bromide, iodide, or chloride may be employed. Preferably a slight excess of the propene over the theoretical amount required is added. The diphenyl starting material and the propene halide may be mixed in an organic solvent and heated in the presence of the alkaline halide receptor for several hours, usually at refluxing temperatures, to complete the reaction. The formation of insoluble material ordinarily indicates the reaction completion. This insoluble material is then filtered off, preferably while the solvent is hot, and recovery and purification of the end product may then be achieved by known procedures.

The reaction of hexestrol with 2-methylallyl halides to form hexestrol-di(2-methylallyl) ether is described by the following formulae:

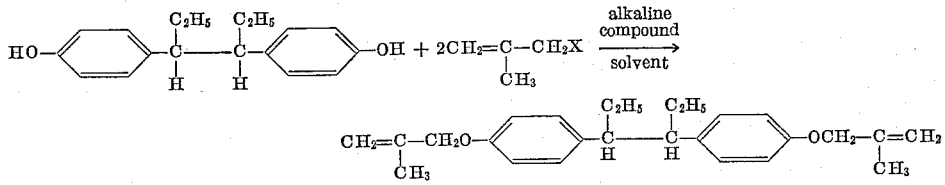

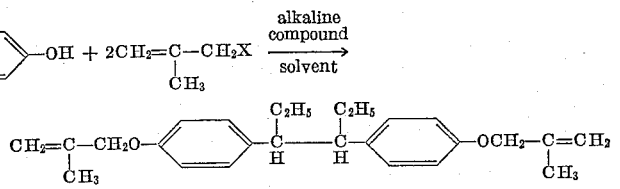

In similar fashion benzestrol may be reacted with a 3-methylallyl-1-halide in the following manner to form benzestrol-di(3-methylallyl) ether:

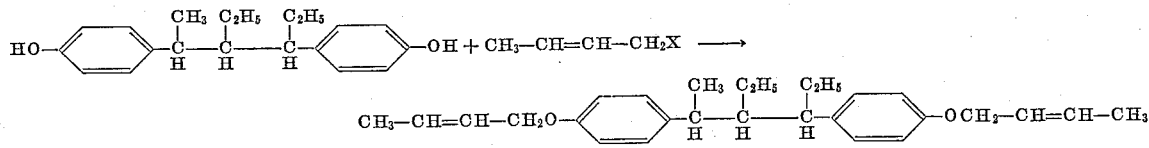

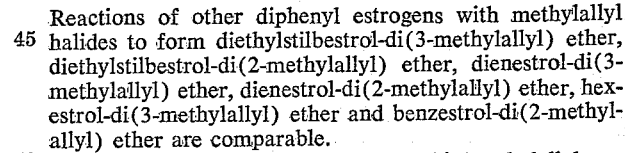

Reactions of other diphenyl estrogens with methylallyl halides to form diethylstilbestrol-di(3-methylallyl) ether, diethylstilbestrol-di(2-methylallyl) ether, dienestrol-di(3-methylallyl) ether, dienestrol-di(2-methylallyl) ether, hexestrol-di(3-methylallyl) ether and benzestrol-di(2-methylallyl) ether are comparable.

We have discovered further that the bis(methylallyloxyphenyl) hexanes, hexenes, and hexadienes prepared according to the above described method may be converted to bis(3-methylallyl-4-hydroxyphenyl) derivatives by heating the first named compounds at about refluxing temperatures with a suitable solvent such as diethylaniline or dimethylaniline. The reaction, preferably carried out in an inert atmosphere such as nitrogen gas, is usually completed in about 6 hours. Lower temperatures may require somewhat longer treatment times. The solvent filtrate may then be contacted with a dilute acid solution such as hydrochloric acid or other suitable acid and recovered and purified by well understood procedures.

The reaction to prepare 3,3'-di(2-methylallyl) hexestrol from the ether is described by the following:

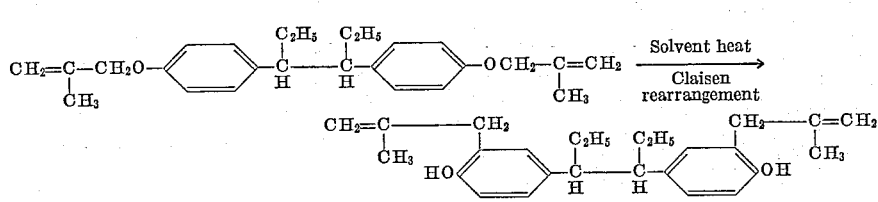

The rearrangement of other diphenyl estrogen ethers to 3,3'-di(methylallyl) compounds such as 3,3'-di(1-methylallyl) benzestrol, 3,3'-di(2-methylallyl) benzestrol and 3,3'-di(1-methylallyl) hexestrol may be similarly accomplished, preferably by refluxing in a nitrogen containing solvent which acts as a diluent.

The reaction for preparing 3,3'-di(1-methylallyl) dienestrol from dienestrol-di(3-methylallyl) ether is illustrated by the following formulae:

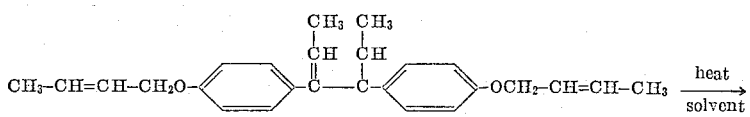

Similarly 3,3'-di(2-methylallyl), dienestrol may be prepared. The reaction to prepare 3,3'-di(1-methylallyl) diethylstilbestrol from diethylstilbestrol-di(3-methylallyl) ether is illustrated by the following formulae:

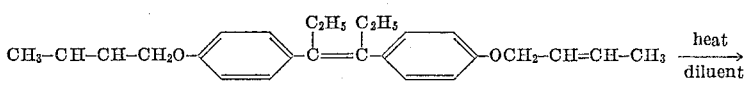

By similar reaction 3,3'-di(2-methylallyl) diethylstilbestrol may be prepared.

Our invention will be more fully illustrated by the following specific examples of the preparation of our non-estrogenic derivatives of synthetic estrogens:

EXAMPLE I

*Preparation of hexestrol-di(2-methylallyl) ether*

90 grams (0.333 mole) of hexestrol, 63 grams (0.7 mole) of 3-chloro-2-methylpropene, and 100 grams (0.72 mole) of anhydrous potassium carbonate were added to 250 ml. of 2-butanone. This mixture was stirred and refluxed for 45 hours. The insoluble material was filtered off while the solvent was hot, the solid washed with 2-butanone, and the combined filtrates evaporated under reduced pressure. The residue was crystallized from methanol and 70 grams of the crude hexestrol-di(2-methylallyl) ether was obtained with a melting point of 86° to 88° C. After three recrystallizations, the ether had a melting point of 90.5–91.5° C.

EXAMPLE II

*Preparation of 3,3'-di(methylallyl)hexestrol*

20 grams of hexestrol-di-(2-methylallyl)ether was refluxed with 100 ml. of N.-diethylaniline for 4 hours. The solution was kept in the cold overnight. Crystals were formed and these were collected and recrystallized from a solvent mixture consisting of one volume of carbontetrachloride and 2 volumes of Skelly F. Yield of pure 3,3'-di(2-methylallyl)hexestrol was 4.7 grams, M.P. 116–118° C. The diethylaniline filtrate was added to 2 N aqueous hydrochloric acid and this mixture was extracted with ether. The ether extract was thoroughly washed with water, dried over sodium sulfate and the ether evaporated. The residue was recrystallized from a 1:2 mixture of carbon tetrachloride and Skelly F. and the additional 9.5 grams of 3,3'-di(2-methylallyl) hexestrol was obtained. Total yield of 3,3'-di(2-methylallyl) hexestrol was 14.2 grams.

The foregoing description has been given for clearness of understanding only and no unnecessary limitations should be understood therefrom as it will be apparent to those skilled in the art that obvious modifications may be resorted to without departing from the basic concept and spirit of this invention.

We claim:
1. A compound selected from the class consisting of hexane, hexene, and hexadiene derivatives, said compound having the following structure:

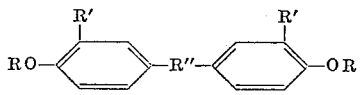

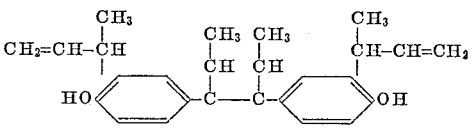

wherein R and R' are selected from a group consisting of hydrogen and a methylallyl radical, provided that when R is hydrogen R' is a methylallyl radical, and that when R' is hydrogen R is a methylallyl radical and R'' is selected from the group consisting of:

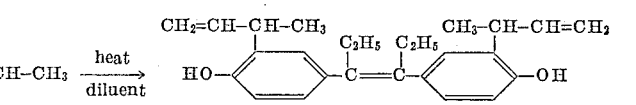

and

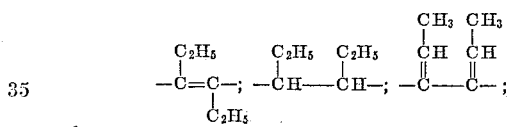

2. A compound having the formulae:

wherein R and R' are selected from a group consisting of hydrogen and a methylallyl radical, provided that when R is hydrogen R' is a methylallyl radical, and that when R' is a hydrogen R is a methylallyl radical.

3. A compound having the formulae:

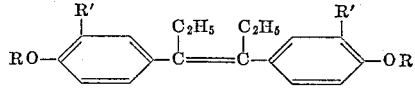

wherein R and R' are selected from a group consisting of hydrogen and a methylallyl radical, provided then when R' is a hydrogen R is a methylallyl radical, and that when R is hydrogen R' is methylallyl.

4. A compound having the formula:

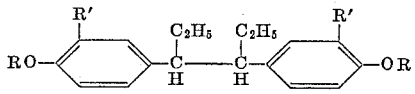

wherein R and R' are selected from a group consisting of hydrogen and a methylallyl radical, provided that when R is a hydrogen R' is a methylallyl radical, and that when R' is hydrogen R is methylallyl.

5. A compound having the formula:

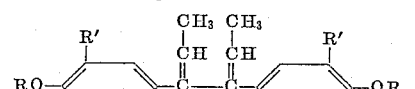

wherein R and R' are selected from a group consisting of hydrogen and a methylallyl radical, provided that when R is hydrogen R' is a methylallyl radical, and that when R' is hydrogen R is methylallyl.

6. 3,3'-di(2-methylallyl)hexestrol.

7. A method for preparing the di-2-methylallyl ether of hexestrol comprising reacting hexestrol with a 2-methylallyl halide by refluxing in the presence of an alkaline halide acceptor compound and separating the insoluble reaction product therefrom.

References Cited by the Examiner

UNITED STATES PATENTS

| 2,502,324 | 3/50 | Kaiser et al. | 260—613 |
| 2,502,325 | 3/50 | Kaiser et al. | 260—613 |

LEON ZITVER, *Primary Examiner.*

CHARLES B. PARKER, *Examiner.*

UNITED STATES PATENT OFFICE
CERTIFICATE OF CORRECTION

Patent No. 3,198,840                                                August 3, 1965

Emil Kaiser et al.

It is hereby certified that error appears in the above numbered patent requiring correction and that the said Letters Patent should read as corrected below.

Columns 3 and 4, lines 10 to 18, in the equation the structure between the phenyl rings, both occurrences, should appear as shown below instead of as in the patent:

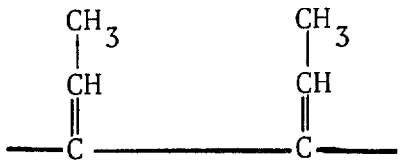

same columns, lines 22 to 29, the left-hand portion of the equation should appear as shown below instead of as in the patent:

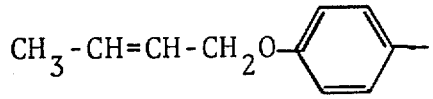

column 3, line 53, for "-di(methylallyl)hexestrol", in italics, read -- -di(2-methylallyl)hexestrol --, in italics; line 54, for "hexestrol-di-(2-methylallyl)" read -- hexestrol-di(2-methylallyl) --; line 55, for "N.-" read -- N- --.

Signed and sealed this 16th day of August 1966.

(SEAL)
Attest:

ERNEST W. SWIDER                                EDWARD J. BRENNER
Attesting Officer                               Commissioner of Patents